US009059756B2

(12) United States Patent
Gaal et al.

(10) Patent No.: US 9,059,756 B2
(45) Date of Patent: Jun. 16, 2015

(54) USING PRECODING VECTOR SWITCHING IN UPLINK SHARED CHANNEL

(75) Inventors: Peter Gaal, San Diego, CA (US); Wanshi Chen, San Diego, CA (US); Xiliang Luo, Cardiff, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/282,406

(22) Filed: Oct. 26, 2011

(65) Prior Publication Data

US 2012/0114014 A1      May 10, 2012

Related U.S. Application Data

(60) Provisional application No. 61/411,912, filed on Nov. 9, 2010.

(51) Int. Cl.
  *H04B 1/00*     (2006.01)
  *H04B 7/04*     (2006.01)
  *H04B 1/713*    (2011.01)

(52) U.S. Cl.
  CPC ............... *H04B 7/0456* (2013.01); *H04B 1/713* (2013.01); *H04B 2201/713* (2013.01); *H04B 7/0404* (2013.01)

(58) Field of Classification Search
  CPC .... H04B 7/0456; H04B 7/0404; H04B 1/713; H04B 2201/713
  USPC ......... 375/132–135, 259–269, 285, 296, 299; 370/335, 342, 345, 336, 438, 441, 442
  See application file for complete search history.

(56) References Cited

U.S. PATENT DOCUMENTS

| 8,374,277 B2 * | 2/2013 | Nakao et al. ................... 375/267 |
| 8,611,449 B2 * | 12/2013 | Tang et al. ..................... 375/267 |
| 2009/0207797 A1 | 8/2009 | Shen et al. |
| 2010/0002800 A1 * | 1/2010 | Kim et al. ....................... 375/295 |
| 2010/0067368 A1 * | 3/2010 | Lee et al. ........................ 370/210 |
| 2010/0142467 A1 | 6/2010 | Tiirola et al. |

(Continued)

FOREIGN PATENT DOCUMENTS

| WO | WO2009149561 A1 | 12/2009 |
| WO | 2010016183 A1 | 2/2010 |

(Continued)

OTHER PUBLICATIONS

International Search Report and Written Opinion—PCT/US2011/058175—ISA/EPO—May 23, 2012.

(Continued)

*Primary Examiner* — Jean B Corrielus
(74) *Attorney, Agent, or Firm* — Arent Fox LLP

(57) ABSTRACT

Methods and apparatuses are provided that include providing transmit diversity for data channel transmissions. Different precoding vectors can be used over different slots of a given subframes to precode corresponding signals. The precoding vectors, in one example, can be orthogonal. In addition, using the different precoding vectors can be determined based on a user equipment receiving an indicator from a base station receiving the data channel transmissions of whether to use frequency hopping over the slots. Moreover, precoding vectors used to precode data channel transmissions can additionally or alternatively vary across subframes.

36 Claims, 10 Drawing Sheets

(56) References Cited

U.S. PATENT DOCUMENTS

| | | | |
|---|---|---|---|
| 2010/0158078 | A1 | 6/2010 | Ro et al. |
| 2010/0173640 | A1 | 7/2010 | Pajukoski et al. |
| 2010/0246516 | A1* | 9/2010 | Pelletier et al. ............... 370/329 |
| 2010/0284363 | A1 | 11/2010 | Ahn et al. |
| 2011/0110307 | A1* | 5/2011 | Ko et al. ....................... 370/328 |
| 2011/0134872 | A1 | 6/2011 | Nakao et al. |
| 2011/0134901 | A1* | 6/2011 | Hoshino et al. ............... 370/344 |
| 2011/0134968 | A1 | 6/2011 | Han et al. |
| 2011/0141941 | A1 | 6/2011 | Lee et al. |
| 2012/0179541 | A1* | 7/2012 | Pasila et al. ................ 705/14.49 |
| 2012/0195292 | A1* | 8/2012 | Ko et al. ....................... 370/336 |
| 2012/0243490 | A1* | 9/2012 | Yu et al. ........................ 370/329 |
| 2013/0034182 | A1* | 2/2013 | Lee et al. ..................... 375/267 |

FOREIGN PATENT DOCUMENTS

| | | |
|---|---|---|
| WO | 2010016273 A1 | 2/2010 |
| WO | WO2010016272 A1 | 2/2010 |

OTHER PUBLICATIONS

Nokia Siemens Networks et al: "UL SU-MIMO UE Transmission modes and control signalling", 3GPP DRAFT; R1-105535, 3rd Generation Partnership Project (3GPP), Mobile Competence Centre; 650, Route Des Lucioles; F-06921 Sophia—Antipolis Cedex; France, vol. RAN WG1, No. Xi'an; Oct. 11, 2010, Oct. 5, 2010, XP050450644, [retrieved on Oct. 5, 2010].

Nokia Siemens Networks et al: "LTE—Advanced SU-MIMO UE Transmission in LTE Release 8 Network", 3GPP DRAFT; R1-091773, 3rd Generation Partnership Project (3GPP), Mobile Competence Centre; 650, Route Des Lucioles; F-06921 Sophia—Antipolis Cedex; France, no. San Francisco, USA; Apr. 28, 2009, XP050339294, [retrieved on Apr. 28, 2009].

"3rd Generation Partnership Project; Technical Specification Group Radio Access Network; Evolved Universal Terrestrial Radio Access (E-UTRA); Physical layer procedures (Release 8)" 3GPP Standard; 3GPP TS 36.213, 3rd Generation Partnership Project (3GPP), Mobile Competence Centre ; 650, Route Des Lucioles ; F-06921 Sophia—Antipolis Cedex ; France, No. V8.3.0, May 1, 2008, pp. 1-47, XP050377558.

Partial International Search Report—PCT/US2011/058175—ISA/EPO—Jan. 24, 2012.

Notice to File a Response dated Jun. 16, 2014 in Korean App. No. 10-2013-7014905, 3 Pages.

"Precoder Switching for UL Tx", 3GPP TSG-RAN WG1 #63 R1-106365, Nov. 10, 2010, pp. 1-9.

* cited by examiner

USING PRECODING VECTOR SWITCHING IN UPLINK SHARED CHANNEL

CLAIM OF PRIORITY UNDER 35 U.S.C. §119

The present Application for Patent claims priority to U.S. Provisional Application No. 61/411,912, entitled, "USING PRECODING VECTOR SWITCHING IN UPLINK SHARED CHANNEL," filed Nov. 9, 2010, and assigned to the assignee hereof and hereby expressly incorporated by reference herein.

BACKGROUND

1. Field

Aspects of the present disclosure relate generally to wireless communication systems, and more particularly, to providing transmit diversity in uplink communication.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. In an example, a base station can assign a number of downlink and/or uplink resources to a UE. Moreover, the base station can allow the UE to establish multiple carriers for communicating with the base station over the downlink or uplink using multiple physical or virtual antennas or other radio resources to improve communication throughput.

SUMMARY

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with applying a transmit diversity scheme to communications transmitted over multiple physical or virtual antenna ports to a base station. For example, data signals can be transmitted over the multiple antennas according to one or more precoding vectors or matrices to improve reliability in receiving such signals. In an example, a data channel transmission can utilize frequency hopping over slots of a subframe to provide transmit diversity for signals transmitted in the slots. For example, this can include utilizing different precoding vectors for each slot where frequency hopping is also utilized to provide further transmit diversity. In addition, determining to use frequency hopping and/or different precoding vectors can be based on a received indicator.

According to an example, a method for wireless data communication is provided that includes determining whether to operate in a frequency hopping mode based on a received frequency hopping value and transmitting, in a first subframe, a first plurality of data transmissions over one or more slots of the first subframe using a first plurality of precoding vectors based on whether it is determined to operate in the frequency hopping mode.

In another example, an apparatus for transmitting wirelessly using transmit diversity is provided. The apparatus includes means for determining whether to operate in a frequency hopping mode based on a received frequency hopping value and means for transmitting, in a first subframe, a first plurality of data transmissions over one or more slots of the first subframe using a first plurality of precoding vectors based on whether the means for determining determines to operate in the frequency hopping mode.

Moreover, for example, a computer program product for transmitting wirelessly using transmit diversity is provided including a non-transitory computer-readable medium having code for causing at least one computer to determine whether to operate in a frequency hopping mode based on a received frequency hopping value. The computer-readable medium further includes code for causing the at least one computer to transmit, in a first subframe, a first plurality of data transmissions over one or more slots of the first subframe using a first plurality of precoding vectors based on whether the code for causing the at least one computer to determine determines to operate in the frequency hopping mode.

In yet another example, a user equipment (UE) supporting uplink transmit diversity is provided. The UE includes at least one processor, and a memory coupled to the at least one processor. The at least one processor can be configured to determine whether to operate in a frequency hopping mode based on a received frequency hopping value and to transmit, in a first subframe, a first plurality of data transmissions over one or more slots of the first subframe using a first plurality of precoding vectors based on whether the at least one processor determines to operate in the frequency hopping mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
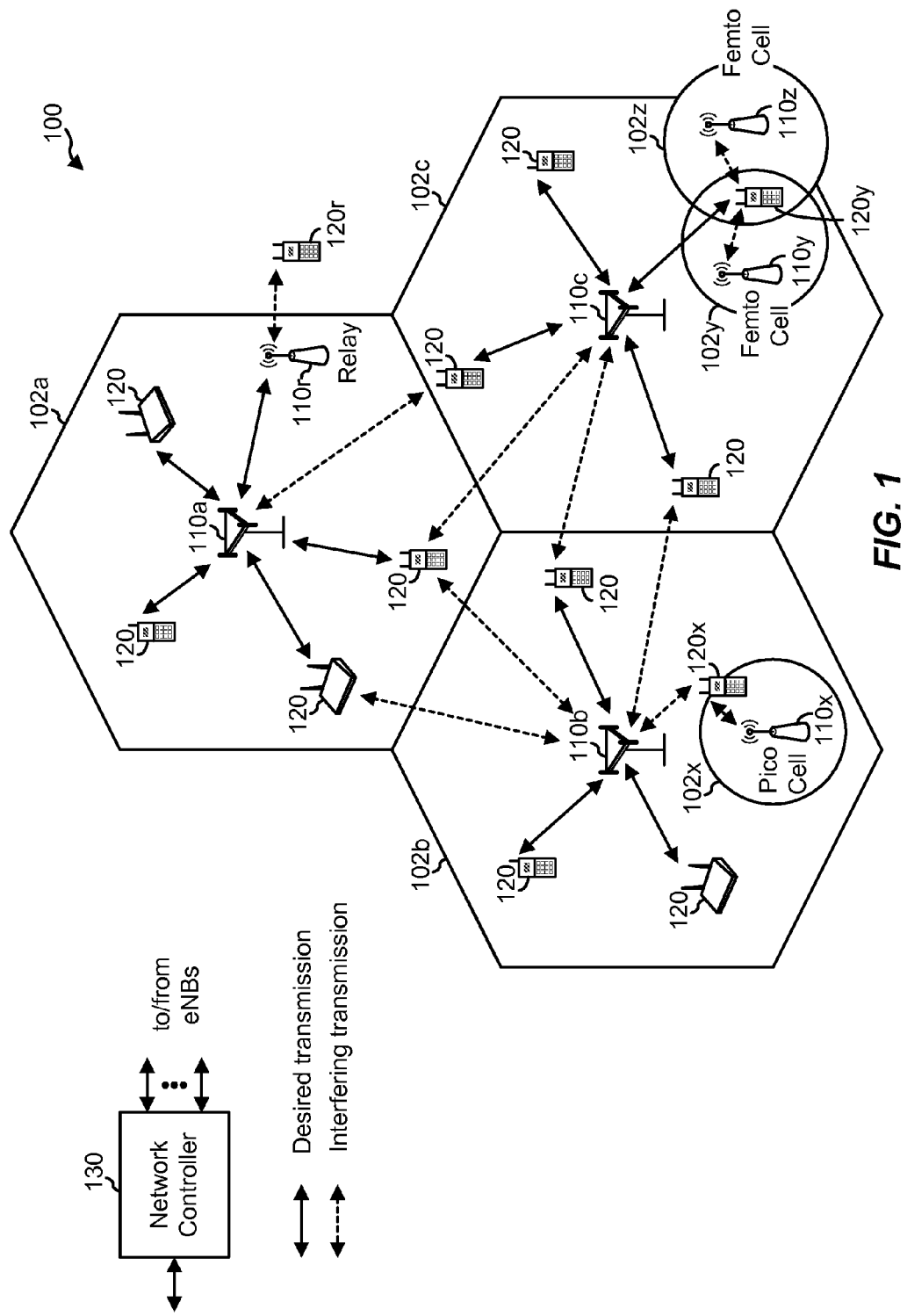
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the user equipments (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a device, a terminal, a mobile station, a subscriber unit, a station, etc. A UE may be a cellular phone, a personal digital assistant (PDA), a wireless modem (or other tethered device), a wireless communication device, a handheld device, a laptop computer, a tablet or netbook computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM or a similar multiplexing scheme and in the time domain with SC-FDM or a similar multiplexing scheme. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
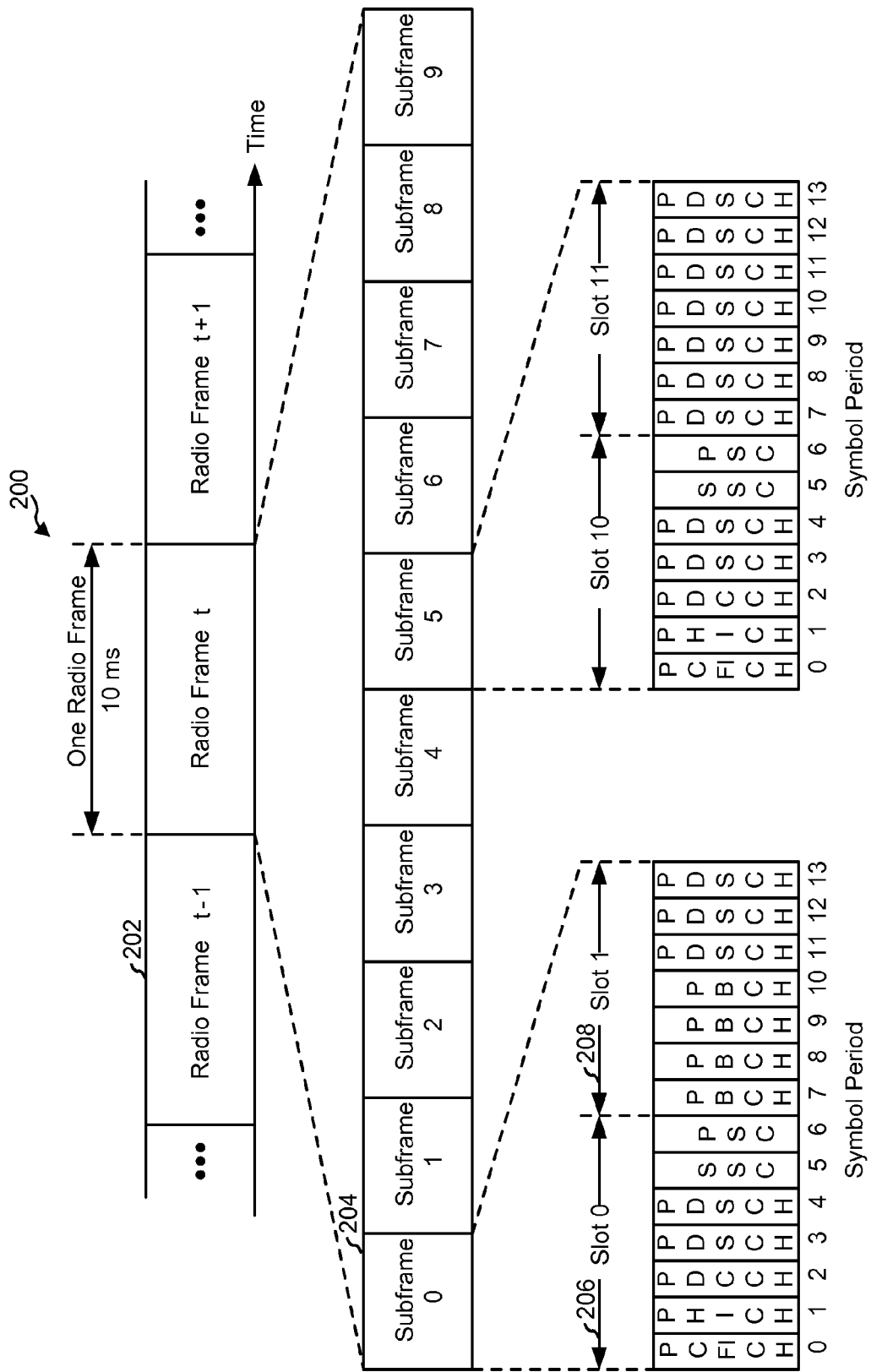
FIG. 2 is a block diagram conceptually illustrating an example of a downlink frame structure in a telecommunications system.

FIG. 2 shows a down link frame structure 200 used in LTE. The transmission timeline for the downlink may be partitioned into units of radio frames, such as radio frame 202. Each radio frame may have a predetermined duration (e.g., 10 milliseconds (ms)) and may be partitioned into 10 subframes with indices of 0 through 9, such as subframe 0 204. Each subframe may include two slots, such as slot 0 206 and slot 1 208. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical hybrid automatic repeat/request (HARQ) Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels can correspond to an LTE configuration.

The eNB may send the PSS, SSS and PBCH in a center of the system bandwidth used by the eNB (e.g., a center 1.08 megahertz (MHz)). The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REG). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc. Moreover, it is to be appreciated that the UE can utilize a similar subframe and slot structure to communicate with the eNB on the uplink. For example, the UE can transmit physical uplink control channel (PUCCH), physical uplink shared channel (PUSCH), sounding reference signal (SRS), or other communications over one or more symbol periods in one or more slots of a subframe.

Figure 3:
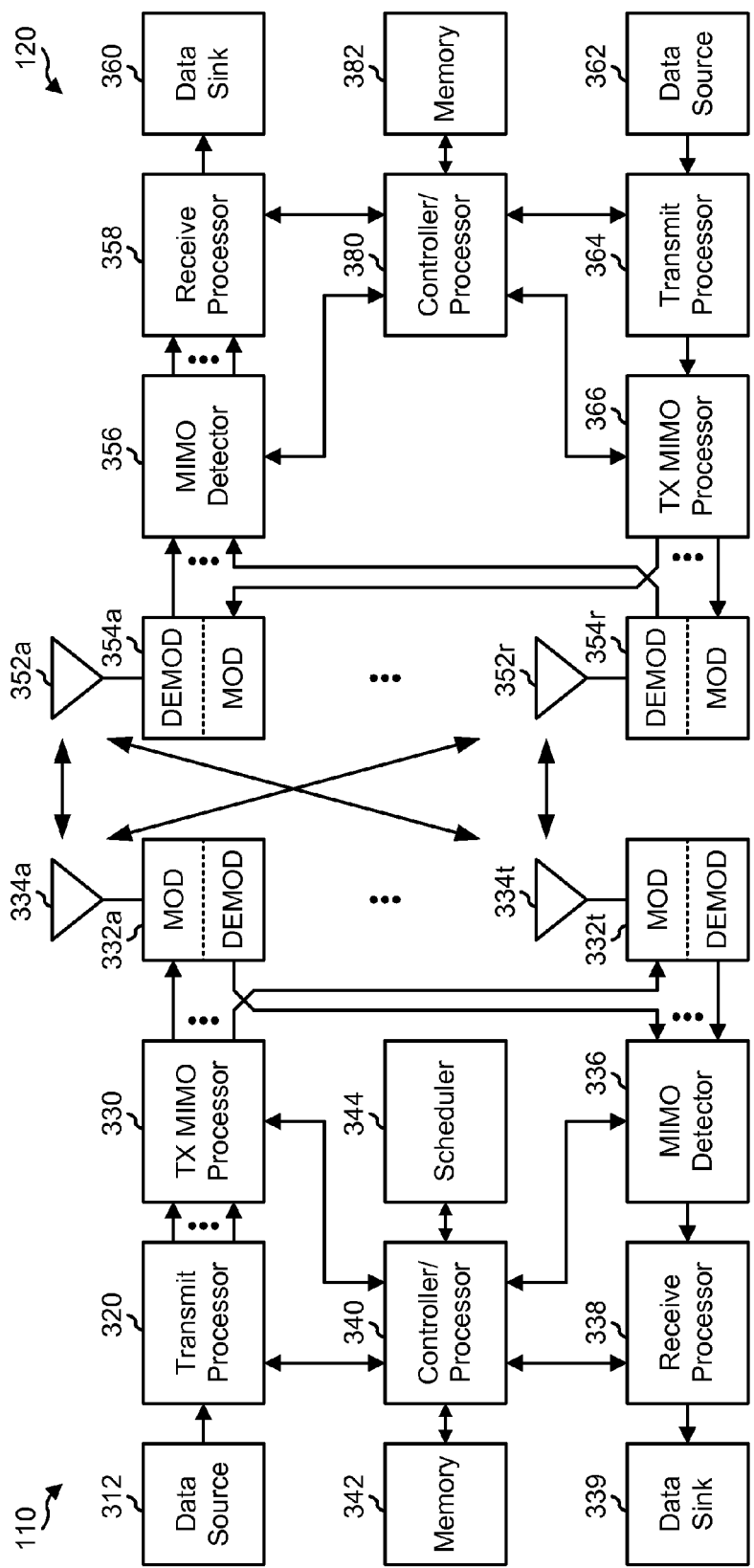
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 6, 8, and 9, and/or other processes for the techniques described herein. In addition, for example, the processor 380 can comprise or at least be operatively coupled to modules illustrated in FIG. 10 for performing aspects described herein. The memories 342 and 382 may store data and program codes for the base station 110 and the UE 120, respectively, which can include instructions for executing the methods in FIGS. 6 8, and 9, the modules in FIG. 10, and/or the like. A scheduler 344 may schedule UEs for data transmission on the downlink and/or uplink.

Carrier Aggregation

LTE-Advanced UEs can use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments can conserve spectrum and are a good fit for the typically asymmetric bandwidth utilization by broadband subscribers, though other assignments can be possible.

Carrier Aggregation Types

Figure 4A:
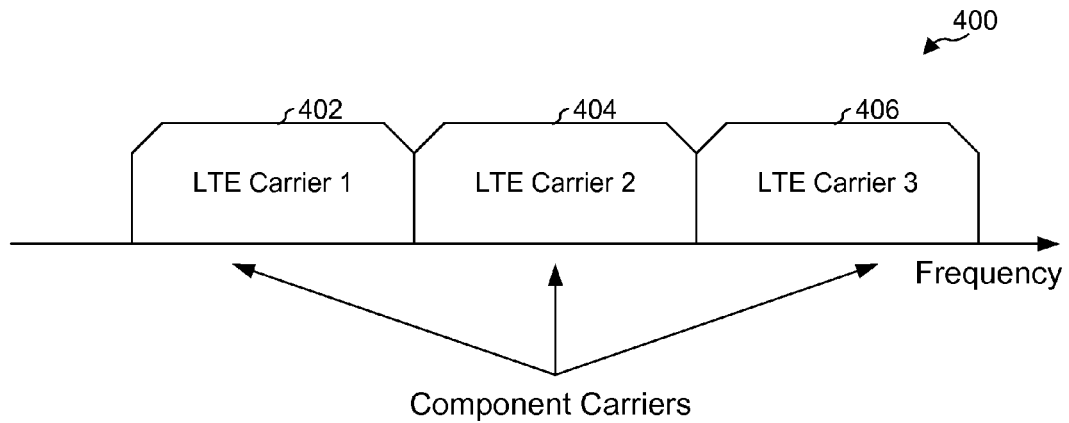
FIG. 4A discloses a continuous carrier aggregation type.
Figure 4B:
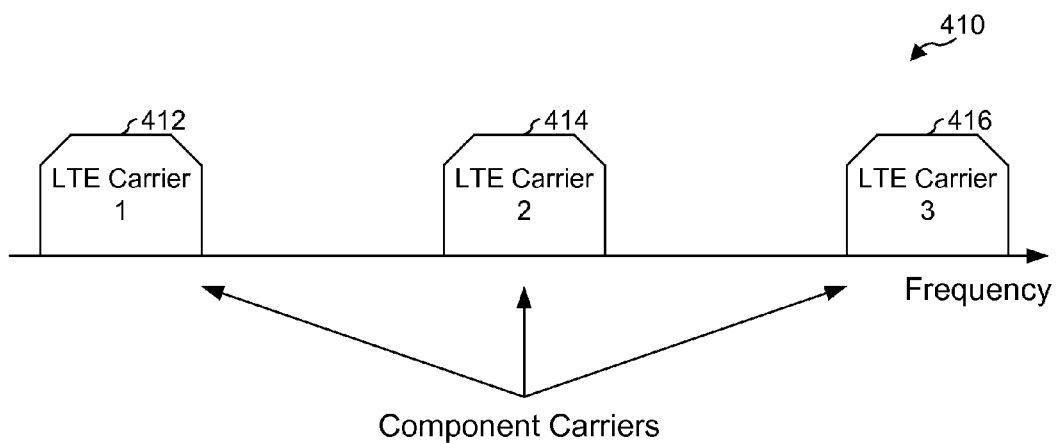
FIG. 4B discloses a non-continuous carrier aggregation type.

For the LTE-Advanced mobile systems, two types of carrier aggregation (CA) methods have been proposed, continuous CA and non-continuous CA, examples of which are illustrated in FIGS. 4A and 4B. Non-continuous CA occurs when multiple available component carriers 410 are separated along the frequency band (FIG. 4B). On the other hand, continuous CA occurs when multiple available component carriers 400 are adjacent to each other (FIG. 4A). As shown, for example, in continuous CA, carrier 1 402, carrier 2 404, and carrier 3 406 are adjacent in frequency. In non-continuous CA, carrier 1 412, carrier 2 414, and carrier 3 416 are not adjacent in frequency. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
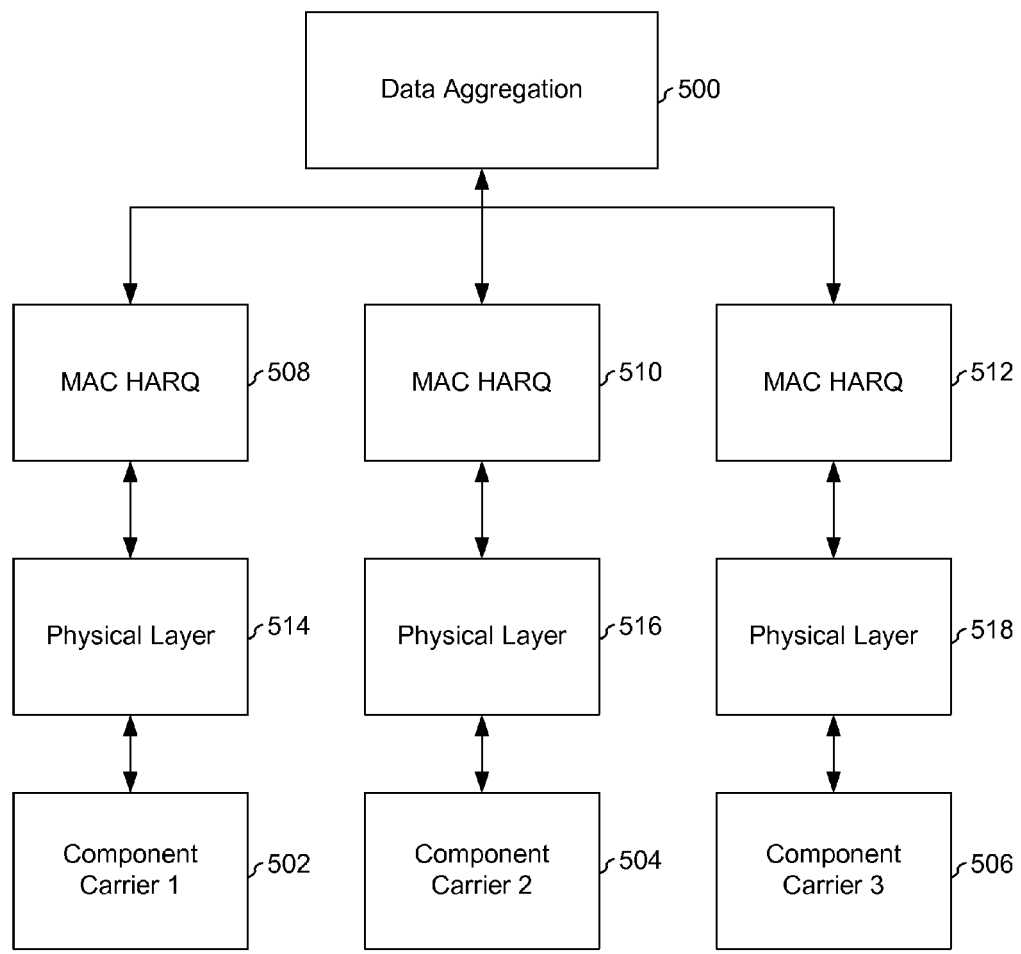
FIG. 5 discloses MAC layer data aggregation.

FIG. 5 illustrates performing data aggregation 500 to aggregate transmission blocks (TBs) from different component carriers 502, 504, and 506 at the medium access control (MAC) layer (FIG. 5) for an International Mobile Telecommunications (IMT)-Advanced or similar system. With MAC layer data aggregation, each component carrier has its own independent hybrid automatic repeat request (HARQ) entity 508, 510, and 512 in the MAC layer and its own transmission configuration parameters (e.g., transmitting power, modulation and coding schemes, and multiple antenna configuration) in the physical layer. Similarly, in the physical layer, one HARQ entity 514, 516, and 518 can be provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (e.g., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Figure 6:
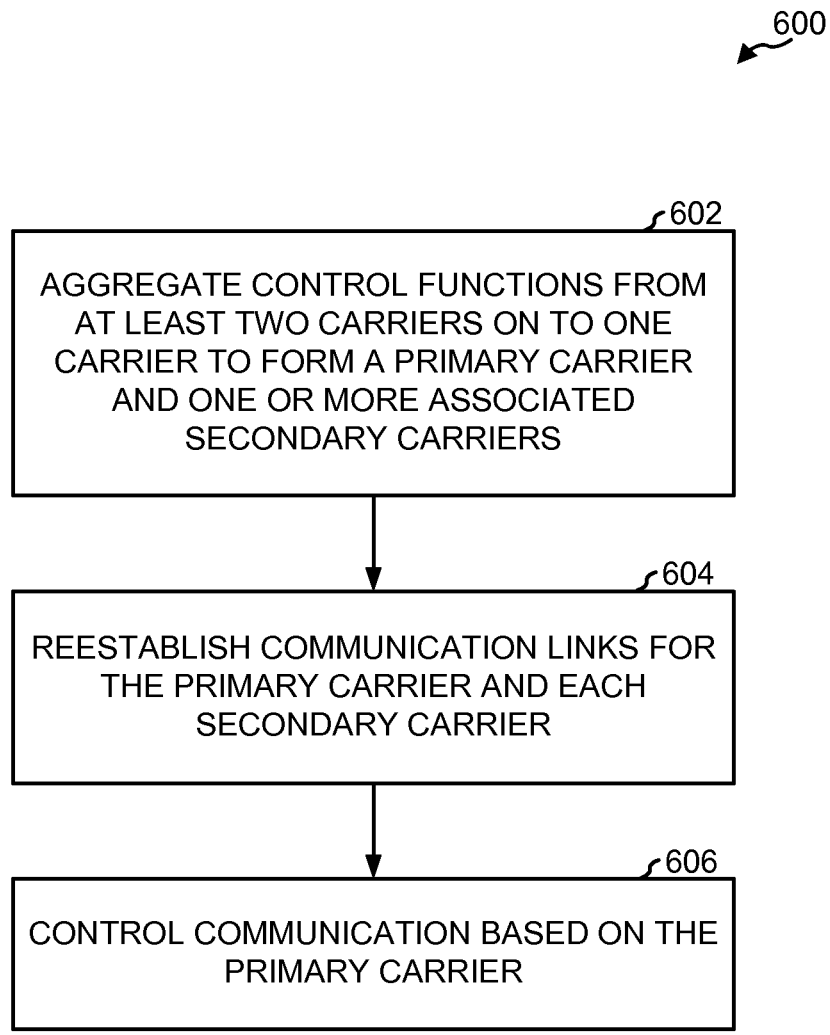
FIG. 6 is a block diagram illustrating a methodology for controlling radio links in multiple carrier configurations.

FIG. 6 illustrates a methodology 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next at block, 604, communication links are established for the primary carrier and each secondary carrier. Then, communication is controlled based on the primary carrier in block 606.

Transmit Diversity in Multi-Carrier Configurations

Transmit diversity schemes can be defined for data channel transmissions in a multi-antenna wireless communication system. Transmit diversity can be used, for example, to help overcome the effects of fading, outages, and circuit failures. Transmit diversity uses radio signals that originate from two or more sources which are independent and that have been modulated with identical or at least substantially similar information-bearing signals to communicate. Also, transmission characteristics of the radio signals may vary at a given period of time. Improvement for a received signal when using diversity transmission depends on the independence of the fading characteristics of the signal as well as circuit outages and failures, for example. In LTE, transmit diversity may be defined for one data stream for transmission over two and four transmit antenna configurations. The data stream may also be referred to as a codeword, for example, when one transport block cyclic redundancy check (CRC) is used for each data stream. One layer on LTE can refer to one stream of data. The rank of the transmission is equal to the number of layers transmitted. The number of antenna ports can be greater than or equal to the number of layers, which can be greater than or equal to the number of codewords.

With codebook-based precoding, modulation symbols corresponding to transport blocks can be mapped to NL layers, where N is a number of transmit antennas, and L is a number of layers transmitted per transmit antenna. The layers can be mapped to the antenna ports. In addition, the antenna ports can correspond to physical and/or virtual antenna ports. In LTE, for example, there is a maximum of four antenna ports, and a maximum of four layers due to the fact that there is a maximum of four cell-specific reference signals in a cell and because codebook-based precoding relies on cell-specific reference signals for channel estimation.

In certain examples, a data channel communication can be transmitted using the one or more transmit diversity schemes. For example, in LTE, a PUSCH communication can be transmitted using precoding vector switching (PVS). For example, a UE, such as UE 120, can utilize multiple precoding vectors (e.g., in a precoding matrix) for transmitting signals in a given time period. The plurality of precoding vectors can each correspond to a physical or virtual transmit antenna of the UE 120, in one example.

The UE 120 may use the PVS as follows, in one example. The UE 120 can select a first plurality of precoding vectors for at least the first slot transmission in a subframe, while perhaps selecting a second plurality of precoding vectors for the second slot transmission in the same subframe. For example, where the UE 120 operates using frequency hopping, the UE 120 can hop precoding vectors over the slot boundary by selecting or otherwise using the second plurality of precoding vectors for the second slot as different from the first plurality of precoding vectors. Where the UE 120 operates without frequency hopping, the UE 120 can use the same precoding vectors for both slots in the subframe. In one example, using the first and second pluralities of precoding vectors to precode transmissions can result in orthogonalized transmissions in the sense that the effective frequency channels over which the transmissions occur can become independent over the slots. In one example, the precoding vectors can be orthogonal, in this regard. In either case, to provide additional transmit diversity, in one example, the UE 120 can use different pluralities of precoding vectors in a subsequent subframe.

Frequency hopping can correspond to transmitting or receiving on a carrier at one frequency in a period of time for transmitting signals, while transmitting or receiving on a carrier at another frequency in a subsequent period of time, and so on. As described herein, the frequencies utilized for frequency hopping by a UE 120 can be different at least among slots in a given subframe. The frequencies can be completely orthogonal, in one example, such that portions of the frequencies do not overlap, or at least partially orthogonal such that a portion of the frequencies may overlap. In another example, the frequencies may be adjacent.

In one example, the UE 120 can receive an indication of whether to operate in a frequency hopping mode or to operate in a non-frequency hopping mode from an eNB 110 or other network component. The indication can be transmitted by the eNB 110 as a frequency hopping field comprising one or more bits in a control channel, such as a PDCCH, or other channel (e.g., a broadcast channel with system information) received by UE 120. It is to be appreciated that other signaling can be used as well (e.g., at a higher layer) to convey the frequency hopping field. Based in part on receiving the indication, in one example, the UE 120 can determine to perform frequency hopping, and can select precoding vectors for each slot in a given subframe that result in different precodings across slot boundaries to provide further transmit diversity. In other examples, such an indication can be received in a configuration, hardcoding, etc.

UE 120 can use PVS, as described herein, with open loop transmit diversity. With an open loop operation, the network does not select a precoder matrix based on feedback from the UE 120. Also, the receiving eNB 110 does not receive a report from the UE 120 about precoder configuration. That is, precoding vectors used by the UE 120 in one or more slots of a given subframe are transparent to the eNB 110 receiving the data channel (e.g., PUSCH) transmissions. Thus, the eNB 110 does not have to know the two precoding vectors to decode and demodulate the received data channel. Instead, the UE can select the precoder matrix in advance (e.g., according to a predefined or deterministic configuration).

In another example, upon receiving the indication, the UE 120 can determine to not perform frequency hopping (e.g., operate in a non-frequency hopping mode). In this example, the UE 120 can use a similar precoding vector for precoding transmissions in multiple slots of a given subframe. In one example, however, the UE 120 may hop frequencies between subframes and/or can use different and/or orthogonal precoding vectors in the subframes. Transmissions communicated in a subsequent subframe can be retransmissions of previous subframe transmissions, but can use a different precoding vector and/or frequency hopping, which may improve quality of the retransmissions (e.g., where the frequency for the retransmission is subject to less interference).

In addition, UE 120 can select the precoding vectors for given slots and/or subframes based on an operational criterion such as a measure of channel correlation (e.g., a channel correlation value). For example, for correlated channels, the UE 120 may change the precoding vectors used from one slot or subframe to the next. In one aspect, as stated above, the selection of precoding vectors at a UE 120 may be transparent to a receiving eNB 110. In other examples, the UE 120 can select the precoding vectors according to one or more patterns over a period of time, such as a fixed or otherwise configured pattern, a random pattern, a pseudo-random pattern based on one or more aspects (such as an identifier of the UE 120), and/or the like. For example, the UE 120 can use precoding vectors such as [1, exp{ja}, exp{jb}, ...], where a, b, ... are phases that can hop over a period of time.

In one aspect, the PVS scheme by which the UE 120 selects precoding vectors may result in antenna virtualization, effectively allowing UE 120 to transmit in a single antenna port mode over a plurality of physical antennas. In one aspect, the UE 120 may be able to use full power for the transmit diversity based transmission. In one aspect, due to mutual orthogonalization, antenna properties such as fading, antenna gain imbalance (AGI), etc. of one antenna may not impact the quality of transmission from the other antenna.

Figure 7:
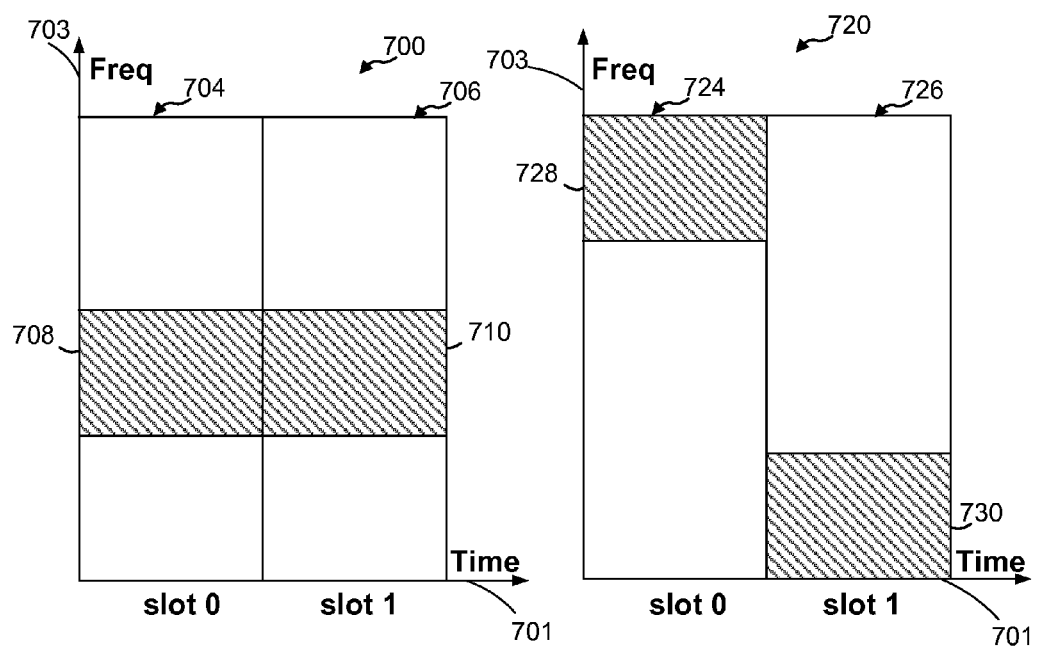
FIG. 7 is a block diagram of example resource blocks.

With reference to FIG. 7, resource block (RB) assignment 700 depicts an example when no frequency hopping is performed in PUSCH transmissions (e.g., because the corresponding frequency hopping field in PDCCH may be set to zero). The frequency resources used for transmitting are plotted along the horizontal axis 701 representing time and the vertical axis 703 representing frequency.

As may be seen for the RB assignment 700, the transmission resources 708, assigned in slot 0 704 and the transmission resources 710 assigned in slot 1 706 may occupy the same frequencies (e.g., when frequency hopping is turned off). Slot 0 704 and slot 1 706 can occupy a single subframe. In some designs, the same precoding vector $[a,b]^T$ can be used for PUSCH transmissions in both slot 0 704 and slot 1 706 in a subframe. In one aspect, using the same precoding vector may help average pilot signals over the two slots to obtain improved receiving gains.

Referring to the RB assignment 720, where PUSCH are transmitted with frequency hopping, the resource block 728 is assigned to the PUSCH transmission in slot 0 724, and the resource block 730, occupying a different frequency, is assigned to PUSCH transmission in slot 1 726. In some designs, transmission in the different slots can be performed using precoding vectors that are orthogonal to, or at least different from, each other: $[a,b]^T$ in slot 0 724 and $[c,d]^T$ in slot 1 726. In some designs, entries a, b, c, and d can represent arbitrary real or complex numbers. It will be appreciated that in RB assignment 720, using such frequency hopping results in orthogonalized (non-overlapping) assignment of frequency resources between slot 0 and slot 1; additionally using PVS for precoding over the slots provides another layer of transmit diversity, as described.

Figure 8:
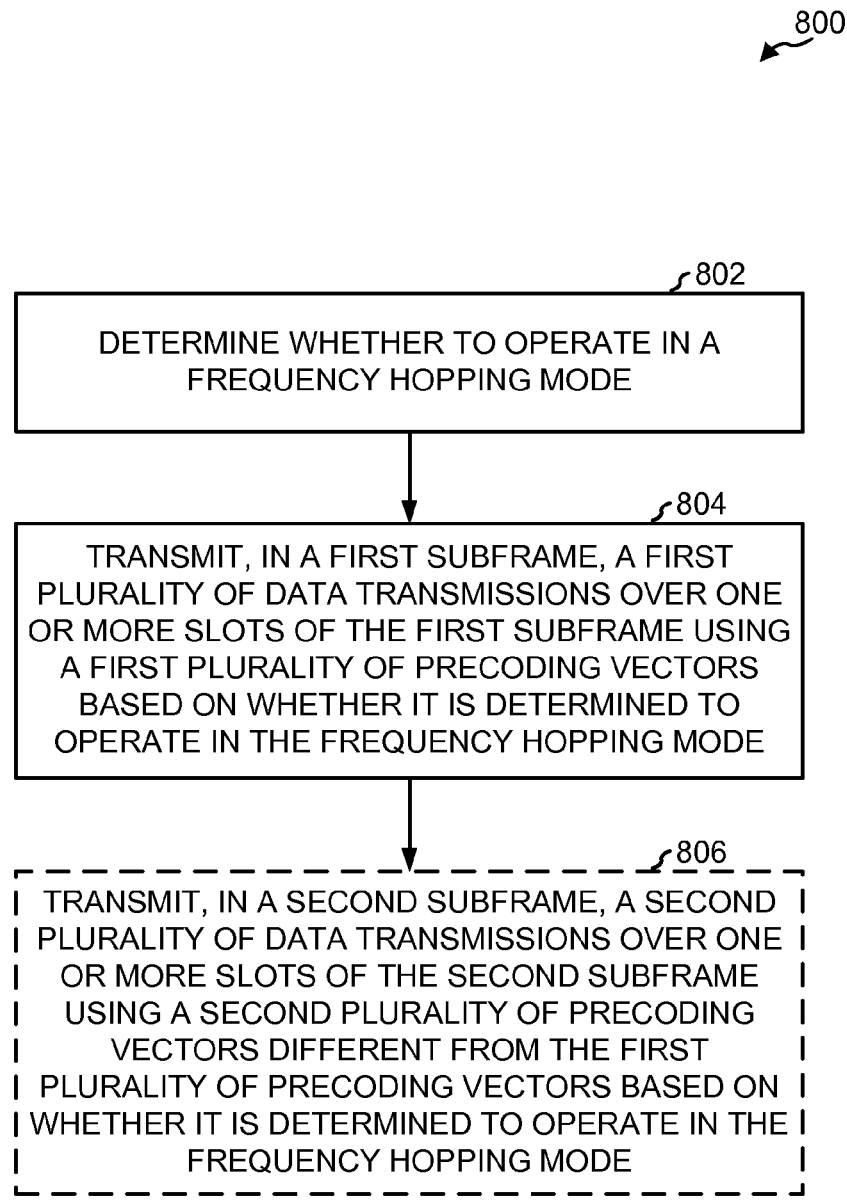
FIG. 8 is a flowchart representation of a methodology of wireless communication.
Figure 9:
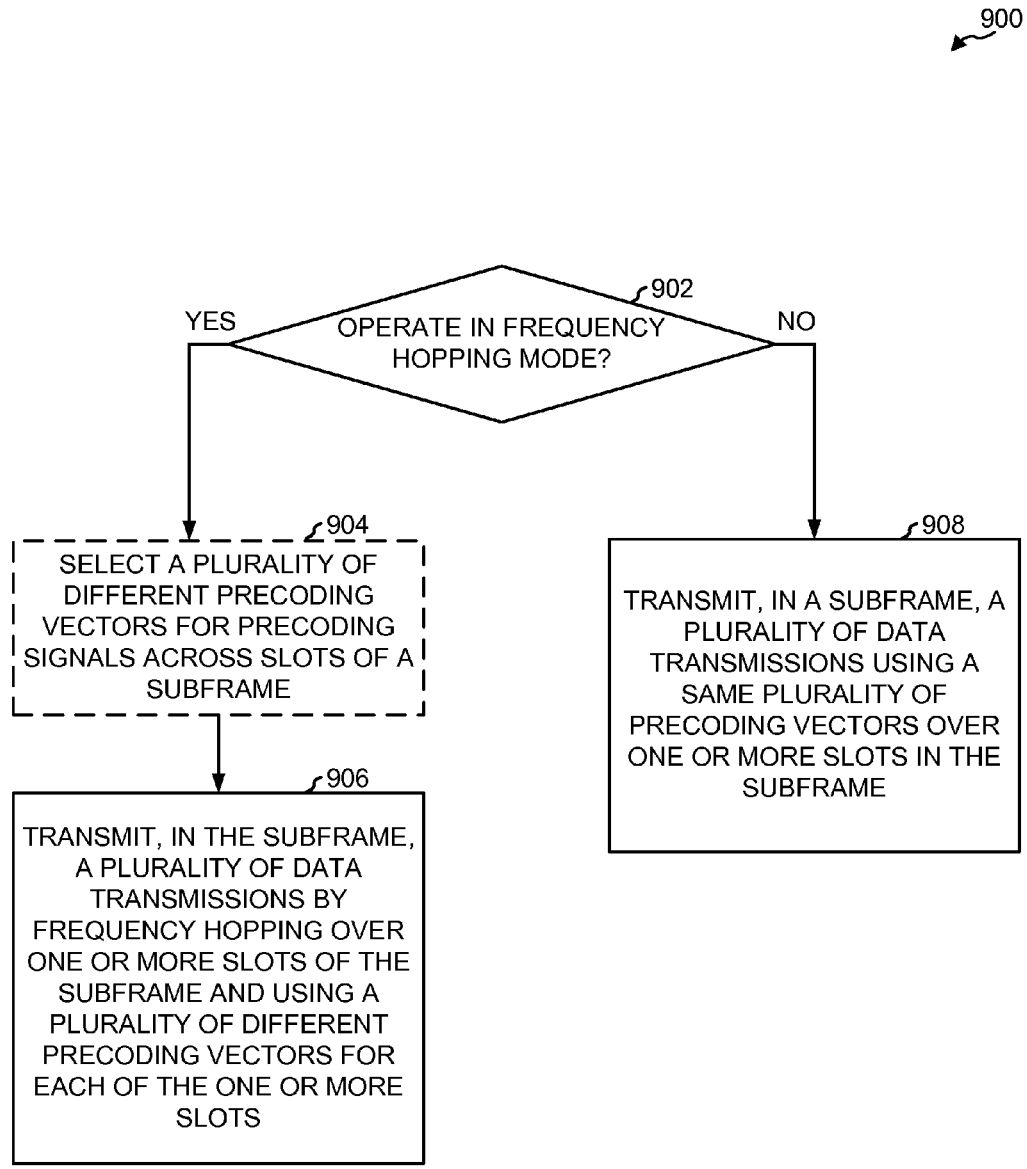
FIG. 9 is a flowchart representation of a methodology of wireless communication.

FIGS. 8-9 illustrate example methodologies relating to transmitting data communications over slots of a subframe. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 8 is a flowchart representation of a methodology 800 of wireless communication.

At block 802, it can be determined whether to operate in a frequency hopping mode. For example, this can include a UE 120 receiving an indicator from an eNB 110 (e.g., over a PDCCH transmission, or other signaling at one or more communication layers) that specifies whether to use the frequency hopping mode. For example, this can be a field in a channel that comprises a single bit specifying whether or not to operate in frequency hopping mode. In other examples, the field may comprise a plurality of bits. In addition, a processor, such as processor 380, can perform the determining of whether to operate in a frequency hopping mode. In this example when the single bit frequency hopping field in a corresponding PDCCH is set to 1, frequency hopping may be enabled for PUSCH transmission. The UE 120 can then transmit the PUSCH in a first slot, slot 0 724, at a first frequency and then switch frequencies at a slot boundary between the first slot and another slot, slot 1 726, and transmit the PUSCH in the another slot, slot 1 726, at a second frequency. In addition, the precoding vector for a PUSCH transmission can hop from slot to slot within a subframe. Changing the PVS vector at slot level in addition to changing the frequency at slot level to transmit the PUSCH when the single bit frequency hopping field in the corresponding PDCCH is set to 1 offers further transmit diversity.

At block 804, a first plurality of data transmissions can be transmitted in a first subframe over one or more slots of the first subframe using a first plurality of precoding vectors based on whether it is determined to operate in the frequency hopping mode. For example, where the UE 102 determines to operate in the frequency hopping mode, different precoding vectors can be selected for different ones of the slots of the first subframe. Additionally, in this example, PVS can be used to apply the different precoding vectors in transmitting the data transmissions over the slots. This can result in data transmissions, e.g., PUSCH transmissions, over different frequencies in the slots of the first subframe using different precoding vectors. In the first slot the UE 120 may transmit the PUSCH at a first frequency using a first precoding vector. Then at the slot boundary with a second slot switch, the UE 120 can hop to a second frequency and/or hop to a second precoding vector, and transmit the PUSCH at the second frequency using the second precoding vector. In one example, the precoding vectors can be orthogonal such to result in transmitting orthogonal signals over the different frequencies. Where the UE 120 determines to operate in a non-frequency hopping mode, for example, the precoding vectors used can be the same across slots of the first subframe.

Optionally, at block 806, a second plurality of data transmissions can be transmitted in a second subframe over one or more slots of the second subframe using a second plurality of precoding vectors different from the first plurality of precoding vectors based on whether it is determined to operate in the frequency hopping mode. As described, different, orthogonal, or same precoding vectors can be used over the slots in the second subframe based on whether the UE 120 determines to operate in a frequency hopping or non-frequency hopping mode. Moreover, for example, the precoding vectors used across subframes can be different and/or orthogonal as well. The transmitting, for example, can be performed by one or more transmitters or related components of a UE 120, such as a transmit processor 364, a TX MIMO processor 366, an antenna 352a, and/or the like.

FIG. 9 is a flowchart representation of a methodology 900 of wireless communication.

At block 902, it can be determined whether to operate in a frequency hopping mode. For example, this can be based on a UE 120 receiving an indicator from an eNB 110 (e.g., in a bit or other field over a control channel transmission), as described. A processor, such as processor 380, can be used to perform the determining.

If it is determined to operate over a frequency hopping mode, optionally at block 904, a plurality of different precoding vectors for precoding signals across slots of a subframe can be selected. For example, the plurality of different precoding vectors can be selected in part by at least one of using PVS, as described, a channel correlation value (e.g., using similar precoding vectors for correlated channels), one or more patterns, and/or the like. In any case, the precoding vectors for a given slot can be orthogonal to those of another slot in the subframe. This can provide transmit diversity, as described. In addition, a processor, such as processor 380, can perform the selecting, in one example.

At block 906, a plurality of data transmissions can be transmitted in the subframe by frequency hopping over one or more slots of the subframe and using a plurality of different precoding vectors for each of the one or more slots. For example, the plurality of different precoding vectors can be those selected at optional block 904 or otherwise acquired for frequency hopping. The plurality of different precoding vectors can vary for each slot and, in one example, can be orthogonal to precoding vectors for other slots in the subframe.

If it is determined not to operate in the frequency hopping mode, at block 908, a plurality of data transmissions can be transmitted in a subframe using a same plurality of precoding vectors over one or more slots in the subframe. The same plurality of precoding vectors can be received or otherwise determined as described above. In addition, in either case, precoding vectors can vary in a subsequent subframe. The transmitting, for example, can be performed by one or more transmitters or related components of a UE 120, such as a transmit processor 364, a TX MIMO processor 366, an antenna 352a, etc.

Figure 10:
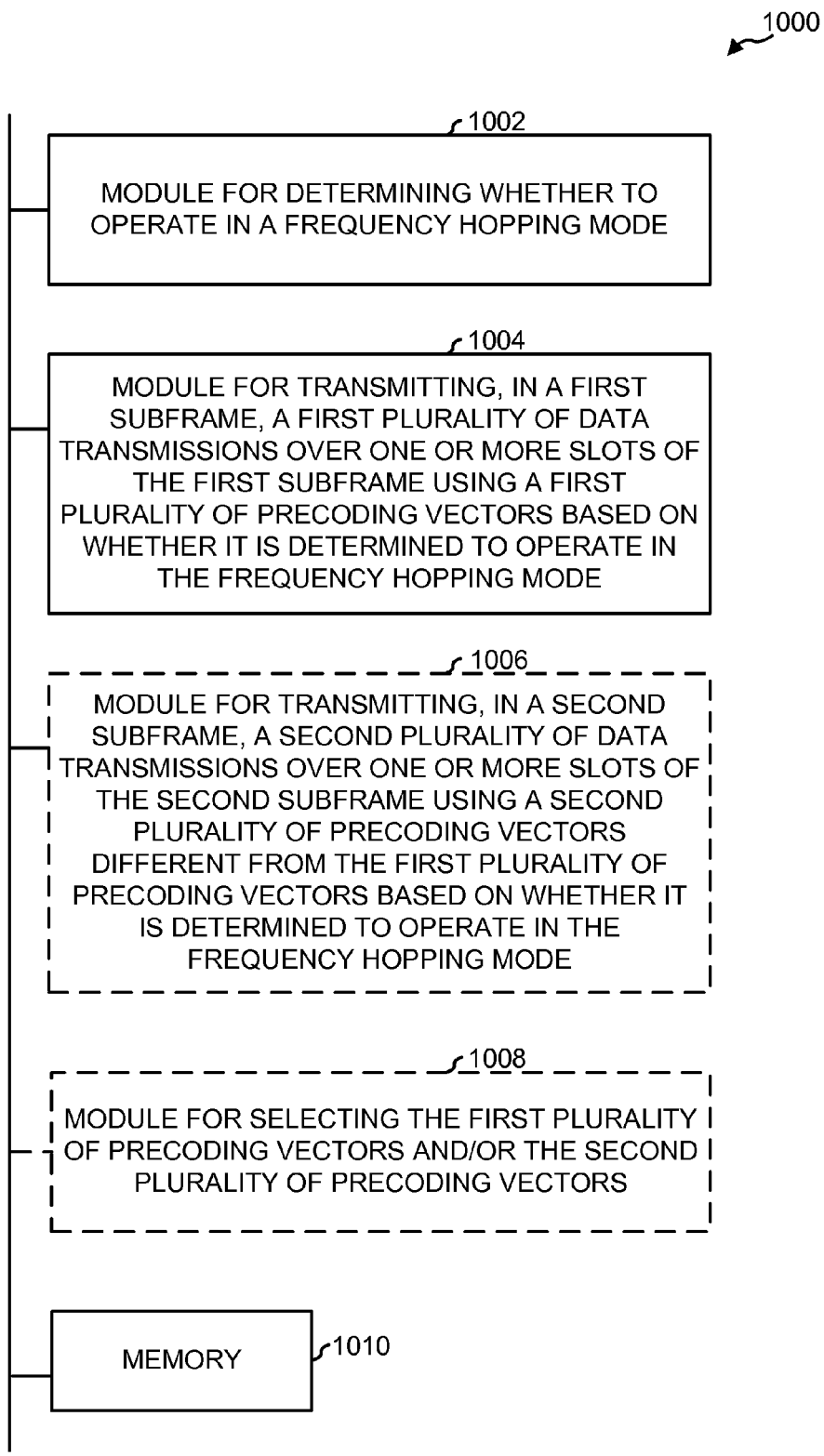
FIG. 10 is a block diagram representation of a portion of a wireless communication apparatus.

FIG. 10 is a block diagram representation of a portion of a wireless communication apparatus 1000 comprising module 1002 for determining whether to operate in a frequency hopping mode and module 1004 for transmitting, in a first subframe, a first plurality of data transmissions over one or more slots of the first subframe using a first plurality of precoding vectors based on whether it is determined to operate in the frequency hopping mode. The apparatus 1000 also optionally includes module 1006 for transmitting, in a second subframe, a second plurality of data transmissions over one or more slots of the second subframe using a second plurality of precoding vectors different from the first plurality of precoding vectors based on whether it is determined to operate in the frequency hopping mode. The apparatus 1000 further includes an optional module 1008 for selecting the first plurality of precoding vectors and/or the second plurality of precoding vectors. For example, module 1008 can select based in part on PVS, a channel correlation value, a pattern, etc. Moreover, the module 1008 can select the first plurality of precoding vectors to be different and/or orthogonal for different slots in the first subframe when operating in the frequency hopping mode, as described. In other examples, the module 1004 can obtain or otherwise generate the first plurality of precoding vectors having such properties from one or more configurations, a hardcoding, and/or the like.

The apparatus 1000 also includes memory 1010 within which the modules 1002, 1004, 1006, and 1008 can be implemented. Additionally or alternatively, memory 1010 can include instructions for executing modules 1002, 1004, 1006, and 1008, parameters related to modules 1002, 1004, 1006, and 1008, and/or the like. The apparatus 1000 may further implement various techniques described herein. In one example, the apparatus 1000 can include a UE 120 with additional components to perform the techniques described herein (e.g., a processor 380 to execute associated instructions, a transmit processor 364, a TX MIMO processor 366, an antenna 352a, etc., for performing transmissions or other communications, and/or the like).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless data communication, comprising:
   determining whether to operate in a frequency hopping mode based on a received frequency hopping value;
   transmitting, by a processor, in a first subframe, a first plurality of data transmissions over two or more slots of the first subframe using a first plurality of precoding vectors based on whether it is determined to operate in the frequency hopping mode,
   wherein more than one of the first plurality of precoding vectors are used in each slot of the two or more slots,
   wherein when not operating in the frequency hopping mode, the first plurality of precoding vectors are the same over the two or more slots in the first subframe,
   wherein when operating in the frequency hopping mode, the first plurality of precoding vectors are different over the two or more slots in the first subframe, more than one precoding vector used in a first slot in the two or more slots correspond to a first frequency, and more than one precoding vector used in a second slot in the two or more slots correspond to a second frequency; and
   switching among the first plurality of precoding vectors that are different over the two or more slots, wherein the switching comprises hopping from one of the more than one precoding vector used in the first slot corresponding to the first frequency to one of the more than one precoding vector used in the second slot corresponding to the second frequency.

2. The method of claim 1, wherein the determining comprises determining to operate in the frequency hopping mode.

3. The method of claim 2, wherein the first plurality of precoding vectors are orthogonal over the two or more slots.

4. The method of claim 2, further comprising selecting at least the first plurality of precoding vectors based at least on a channel correlation value.

5. The method of claim 2, further comprising selecting at least the first plurality of precoding vectors based at least on one or more patterns.

6. The method of claim 1, further comprising transmitting, by the processor, in a second subframe, a second plurality of data transmissions over two or more slots of the second subframe using a second plurality of precoding vectors different from the first plurality of precoding vectors based on whether it is determined to operate in the frequency hopping mode, wherein more than one of the second plurality of precoding vectors are used in each slot of the two or more slots of the second subframe.

7. The method of claim 6, wherein the transmitting of the first plurality of data transmissions and the transmitting of the second plurality of data transmissions comprise transmitting physical uplink shared channels (PUSCH).

8. The method of claim 6, wherein the transmitting of the first plurality of data transmissions and the transmitting of the second plurality of data transmissions comprise orthogonal transmissions based on the first plurality of precoding vectors being orthogonal to the second plurality of precoding vectors.

9. The method of claim 1, wherein the received frequency hopping value comprises at least one bit in a frequency hopping field in a corresponding physical downlink control channel (PDCCH).

10. An apparatus for transmitting wirelessly using transmit diversity, comprising:
    means for determining whether to operate in a frequency hopping mode based on a received frequency hopping value; and
    means for transmitting, in a first subframe, a first plurality of data transmissions over two or more slots of the first subframe using a first plurality of precoding vectors based on whether the means for determining determines to operate in the frequency hopping mode,
    wherein more than one of the first plurality of precoding vectors are used in each slot of the two or more slots,
    wherein when not operating in the frequency hopping mode, the first plurality of precoding vectors are the same over the two or more slots in the first subframe, wherein when operating in the frequency hopping mode, the first plurality of precoding vectors are different over the two or more slots in the first subframe, more than one precoding vector used in a first slot in the two or more slots correspond to a first frequency, and more than one precoding vector used in a second slot in the two or more slots correspond to a second frequency, and wherein the means for determining further comprises means for selecting among the first plurality of precoding vectors that are different over the two or more slots, wherein the means for selecting is configured to hop from one of the more than one precoding vector used in the first slot corresponding to the first frequency to one of the more than one precoding vector used in the second slot corresponding to the second frequency.

11. The apparatus of claim 10, wherein the means for determining determines to operate in the frequency hopping mode.

12. The apparatus of claim 11, wherein the first plurality of precoding vectors are orthogonal over the two or more slots.

13. The apparatus of claim 11, wherein the means for determining is configured to select at least the first plurality of precoding vectors based at least on a channel correlation value.

14. The apparatus of claim 11, wherein the means for determining is configured to select at least the first plurality of precoding vectors based at least on one or more patterns.

15. The apparatus of claim 10, wherein the means for transmitting is configured to transmit, in a second subframe, a second plurality of data transmissions over two or more slots of the second subframe using a second plurality of precoding vectors different from the first plurality of precoding vectors based on whether the means for determining determines to operate in the frequency hopping mode, wherein more than one of the second plurality of precoding vectors are used in each slot of the two or more slots of the second subframe.

16. The apparatus of claim 15, wherein the first plurality of data transmissions and the second plurality of data transmissions comprise physical uplink shared channels (PUSCH) transmissions.

17. The apparatus of claim 15, wherein the first plurality of data transmissions and the second plurality of data transmissions comprise orthogonal transmissions based on the first plurality of precoding vectors being orthogonal to the second plurality of precoding vectors.

18. The apparatus of claim 10, wherein the received frequency hopping value comprises at least one bit in a frequency hopping field in a corresponding physical downlink control channel (PDCCH).

19. A computer program product for transmitting wirelessly using transmit diversity, comprising:
a non-transitory computer-readable medium comprising:
code for causing at least one computer to determine whether to operate in a frequency hopping mode based on a received frequency hopping value;
code for causing the at least one computer to transmit, in a first subframe, a first plurality of data transmissions over two or more slots of the first subframe using a first plurality of precoding vectors based on whether the code for causing the at least one computer to determine determines to operate in the frequency hopping mode,
wherein more than one of the first plurality of precoding vectors are used in each slot of the two or more slots,
wherein when not operating in the frequency hopping mode, the first plurality of precoding vectors are the same over the two or more slots in the first subframe,
wherein when operating in the frequency hopping mode, the first plurality of precoding vectors are different over the two or more slots in the first subframe, more than one precoding vector used in a first slot in the two or more slots correspond to a first frequency, and more than one precoding vector used in a second slot in the two or more slots correspond to a second frequency; and
code for causing the at least one computer to switch among the first plurality of precoding vectors that are different over the two or more slots, wherein the code for causing the at least one computer to switch is configured to hop from one of the more than one precoding vector used in the first slot corresponding to the first frequency to one of the more than one precoding vector used in the second slot corresponding to the second frequency.

20. The computer program product of claim 19, wherein the code for causing the at least one computer to determine determines to operate in the frequency hopping mode.

21. The computer program product of claim 20, wherein the first plurality of precoding vectors are orthogonal over the two or more slots.

22. The computer program product of claim 20, wherein the computer-readable medium further comprises code for causing the at least one computer to select at least the first plurality of precoding vectors based at least on a channel correlation value.

23. The computer program product of claim 20, wherein the computer-readable medium further comprises code for causing the at least one computer to select at least the first plurality of precoding vectors based at least on one or more patterns.

24. The computer program product of claim 19, wherein the computer-readable medium further comprises code for causing the at least one computer to transmit, in a second subframe, a second plurality of data transmissions over two or more slots of the second subframe using a second plurality of precoding vectors different from the first plurality of precoding vectors based on whether the code for causing the at least one computer to determine determines to operate in the frequency hopping mode, wherein more than one of the second plurality of precoding vectors are used in each slot of the two or more slots of the second subframe.

25. The computer program product of claim 24, wherein the first plurality of data transmissions and the second plurality of data transmissions comprise physical uplink shared channel (PUSCH) transmissions.

26. The computer program product of claim 24, wherein the first plurality of data transmissions and the second plurality of data transmissions comprise orthogonal transmissions based on the first plurality of precoding vectors being orthogonal to the second plurality of precoding vectors.

27. The computer program product of claim 19, wherein the received frequency hopping value comprises at least one bit in a frequency hopping field in a corresponding physical downlink control channel (PDCCH).

28. A user equipment (UE) supporting uplink transmit diversity, comprising:
at least one processor; and
a memory coupled to the at least one processor, wherein the at least one processor is configured to:
determine whether to operate in a frequency hopping mode based on a received frequency hopping value;
transmit, in a first subframe, a first plurality of data transmissions over two or more slots of the first subframe using a first plurality of precoding vectors based on whether the at least one processor determines to operate in the frequency hopping mode, wherein more than one of the first plurality of precoding vectors are used in each slot of the two or more slots, wherein when not operating in the frequency hopping mode, the first plurality of precoding vectors are the same over the two or more slots in the first subframe, wherein when operating in the frequency hopping mode, the first plurality of precoding vectors are different over the two or more slots in the first subframe, more than one precoding vector used in a first slot in the two or more slots correspond to a first frequency, and more than one precoding vector used in a second slot in the two or more slots correspond to a second frequency; and switch among the first plurality of precoding vectors that are different over the two or more slots, wherein the switching comprises hopping from one of the more than one precoding vector used in the first slot corresponding to the first frequency to one of the more than one precoding vector used in the second slot corresponding to the second frequency.

29. The UE of claim 28, wherein the at least one processor determines to operate in the frequency hopping mode.

30. The UE of claim 29, wherein the first plurality of precoding vectors are orthogonal over the two or more slots.

31. The UE of claim 29, wherein the at least one processor is further configured to select at least the first plurality of precoding vectors based at least on a channel correlation value.

32. The UE of claim 29, wherein the at least one processor is further configured to select at least the first plurality of precoding vectors based at least on one or more patterns.

33. The UE of claim 28, wherein the at least one processor is further configured to transmit, in a second subframe, a second plurality of data transmissions over two or more slots of the second subframe using a second plurality of precoding vectors different from the first plurality of precoding vectors based on whether the at least one processor determines to operate in the frequency hopping mode, wherein more than one of the second plurality of precoding vectors are used in each slot of the two or more slots of the second subframe.

34. The UE of claim 33, wherein the first plurality of data transmissions and the second plurality of data transmissions comprise physical uplink shared channel (PUSCH) transmissions.

35. The UE of claim 33, wherein the first plurality of data transmissions and the second plurality of data transmissions comprise orthogonal transmissions based on the first plurality of precoding vectors being orthogonal to the second plurality of precoding vectors.

36. The UE of claim 28, wherein the received frequency hopping value comprises at least one bit in a frequency hopping field in a corresponding physical downlink control channel (PDCCH).

* * * * *